United States Patent
Devarao (10) Patent No.: US 9,852,179 B2
(45) Date of Patent: *Dec. 26, 2017

(54) TRAVERSING A SPARQL QUERY AND TRANSLATION TO A SEMANTIC EQUIVALENT SQL

(71) Applicant: International Business Machines Corporation, Armonk, NY (US)

(72) Inventor: Praveen Devarao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,399

(22) Filed: Dec. 19, 2016

(65) Prior Publication Data

US 2017/0091268 A1   Mar. 30, 2017

Related U.S. Application Data (63) Continuation of application No. 15/139,386, filed on Apr. 27, 2016, now Pat. No. 9,589,022, which is a continuation of application No. 14/739,178, filed on Jun. 15, 2015.

(51) Int. Cl.
*G06F 17/30* (2006.01)
(52) U.S. Cl.
CPC .. *G06F 17/30427* (2013.01); *G06F 17/30339* (2013.01)
(58) Field of Classification Search
None
See application file for complete search history.

(56) References Cited

U.S. PATENT DOCUMENTS

| | | | |
|---|---|---|---|
| 7,818,352 B2 | 10/2010 | Krishnamoorthy et al. |
| 8,275,784 B2 | 9/2012 | Cao et al. |
| 8,285,708 B2 | 10/2012 | Bowers et al. |
| 8,412,720 B2 | 4/2013 | Britton et al. |

(Continued)

FOREIGN PATENT DOCUMENTS

CN   102722542 A   10/2012

OTHER PUBLICATIONS

Bornea, et al.; "Building an Efficient RDF Store Over a Relational Database"; SIGMOD'13; Jun. 22-27, 2013; New York, New York, USA; © 2013; ACM 978-1-4503-2037-5/13/06; pp. 121-132.

(Continued)

*Primary Examiner* — Charles Adams
(74) *Attorney, Agent, or Firm* — Gilbert Harmon, Jr.

(57) ABSTRACT

In an approach for semantically translating data. Aspects of an embodiment of the present invention include an approach for semantically translating data, wherein the approach includes a processor selecting a first node. A processor identifies a parent node of the first node. A processor determines that a value of the first node is unknown. A processor responsive to determining that the value of the first node is unknown, annotates the first node to indicate that the first node is at least partially unknown. A processor identifies a common table expression of the first node. A processor determines that the common table expression of the first node matches, within a predetermined threshold, a common table expression of the second node. A processor merges information from the common table expression of the second node with the common table expression of the first node.

1 Claim, 6 Drawing Sheets

(56) References Cited

U.S. PATENT DOCUMENTS

| | | | |
|---|---|---|---|
| 2011/0225167 | A1 | 9/2011 | Bhattacharjee et al. |
| 2014/0067793 | A1 | 3/2014 | Shironoshita |
| 2014/0172914 | A1 | 6/2014 | Elnikety et al. |
| 2014/0304251 | A1 | 10/2014 | Bornea et al. |
| 2016/0103931 | A1 | 4/2016 | Appavu |
| 2016/0364452 | A1 | 12/2016 | Devarao |
| 2016/0364478 | A1 | 12/2016 | Devarao |

OTHER PUBLICATIONS

Chebotko, et al.; "Semantics Preserving SPARQL-to-SQL Translation"; Technical Report TR-DB-112007-CLF; Nov. 2007; pp. 1-34.

Kashlev, et al.; "SPARQL-to-SQL Query Translation: Bottom-Up or Top-Down?"; 2011 IEEE International Conference on Services Computing; © 2011 IEEE; 978-0-7695-4462-5/11; pp. 1-2.

Son, et al.; "Performance Evaluation of Storage-Independent Model for SPARQL-to SQL Translation Algorithms"; © 2011 IEEE; 978-1-4244-8704-2/11; pp. 1-4.

Resource Description Framework; Wikipedia, the free encyclopedia; Printed Mar. 27, 2015; pp. 1-8; <http://en.wikipedia.org/wiki/Resource_Description_Framework>.

"SPARQL"; Wikipedia, the free encyclopedia; Printed Mar. 27, 2015; pp. 1-3; <http://en.wikipedia.org/wiki/SPARQL>.

IBM Appendix P, list of patents or patent applications treated as related, Filed herewith; 2 pages.

Devarao, "Traversing a SPARQL Query and Translation to a Semantic Equivalent SQL", U.S. Appl. No. 15/382,820, Dec. 19, 29 pages.

TRAVERSING A SPARQL QUERY AND TRANSLATION TO A SEMANTIC EQUIVALENT SQL

BACKGROUND OF THE INVENTION

The present invention relates generally to the field of translations, and more particularly to translating SPARQL query to a semantically equivalent SQL.

SPARQL Protocol and RDF Query Language (SPARQL) is a Resource Description Framework (RDF) query language, that is, a semantic query language for databases, able to retrieve and manipulate data stored in RDF format. RDF is a family of specifications originally designed as a metadata data model. SPARQL allows for a query to consist of triple patterns: conjunctions, disjunctions, and optional patterns. Triple patterns for the purpose-built database for storage and retrieval of triples through semantic queries. A triple is a data entity composed of subject-predicate-object. In a RDF model the data is represented as triples wherein the subject is the matter in concern and the object is the description for the matter to the relationship specified by a predicate. Given data of a particular domain when represented as a RDF model can be visualized as a connected graph.

Structured Query Language (SQL) is a special-purpose programming language designed for managing data held in a relationship database management system (RDBMS), or for stream processing in a relationship data stream management system (RDSMS). The RDF model that can be visualized as a connected graph can be persisted in different formats and on different storage systems. One of the repositories of persistence is a RDBMS. Thus the RDF model in the SPARQL language needs to be translated to SQL so that the data retrieved from the database is as expected by the issued SPARQL query.

SUMMARY

As disclosed herein, a computer system for traversing a SPARQL query and translating the SPARQL query to a semantically equivalent SQL query, the computer system comprising: one or more computer processors; one or more non-transitory computer readable storage media; program instructions stored on the one or more computer non-transitory readable storage media for execution by at least one of the one or more computer processors, the program instructions comprising: program instructions to, select, by one or more processors, a first node of the SPARQL query; program instructions to, identify, by the one or more processors, a parent node of the first node; program instructions to, determine, by the one or more processors, that a value of the first node is unknown; program instructions to, respond to determining that the value of the first node is unknown, annotating, by the one or more processors, the first node to indicate that the first node is at least partially unknown; program instructions to, identify, by the one or more processors, a common table expression of the first node; program instructions to, determine, by the one or more processors, that the common table expression of the first node matches, within a first predetermined threshold, a common table expression of a second node; program instructions to, determine, by the one or more processors, that the common table expression of the first node matches, within a second predetermined threshold, the common table expression of the second node and a common table expression of a third node concurrently; program instructions to, merge, by the one or more processors, information from the common table expression of the first node with information from the common table expression of the second node and information from the common table expression of the third node concurrently; program instructions to, merge, by the one or more processors, information from the common table expression of the second node with the common table expression of the first node; program instructions to, determine, by the one or more processors, that the value of the first node can be relocated to a third node; program instructions to, merge, by the one or more processors, the value of the first node with the third node; program instructions to, identify, by the one or more processors, a common table expression of the third node; program instructions to, determine, by the one or more processors, that the common table expression of the third node matches, within a third predetermined threshold, a common table expression of a fourth node; program instructions to, merge, by the one or more processors, information from the common table expression of the third node with the common table expression of the first node; program instructions to, determine, by the one or more processors, the value of the first node can be relocated to the second node and the third node concurrently; program instructions to, respond to merging the information from the common table expression of the second node with the common table expression of the first node, annotating, by the one or more processors, the common table expression of the first node to indicate that the information from the common table expression of the second node has been merged with the common table expression of the first node; program instructions to, determine, by the one or more processors, whether a triple associated with the first node is evaluated; program instructions to, respond to determining, whether the triple associated with the first node is evaluated, merging, by the one or more processors, at least a portion of the triple associated with the first node with at least a portion of the second node; program instructions to, create, by the one or more processors, an SQL query based on the merged common table expressions and program instructions to, retrieve, by the one or more processors, data from a database using the SQL query.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention disclose an approach to convert a given SPARQL to its semantically equivalent SQL.

Embodiments of the present invention disclose a method, computer program product, and computer system, to convert a given SPARQL to its semantically equivalent SQL.

The present invention will now be described in detail with reference to the Figures.

Figure 1:
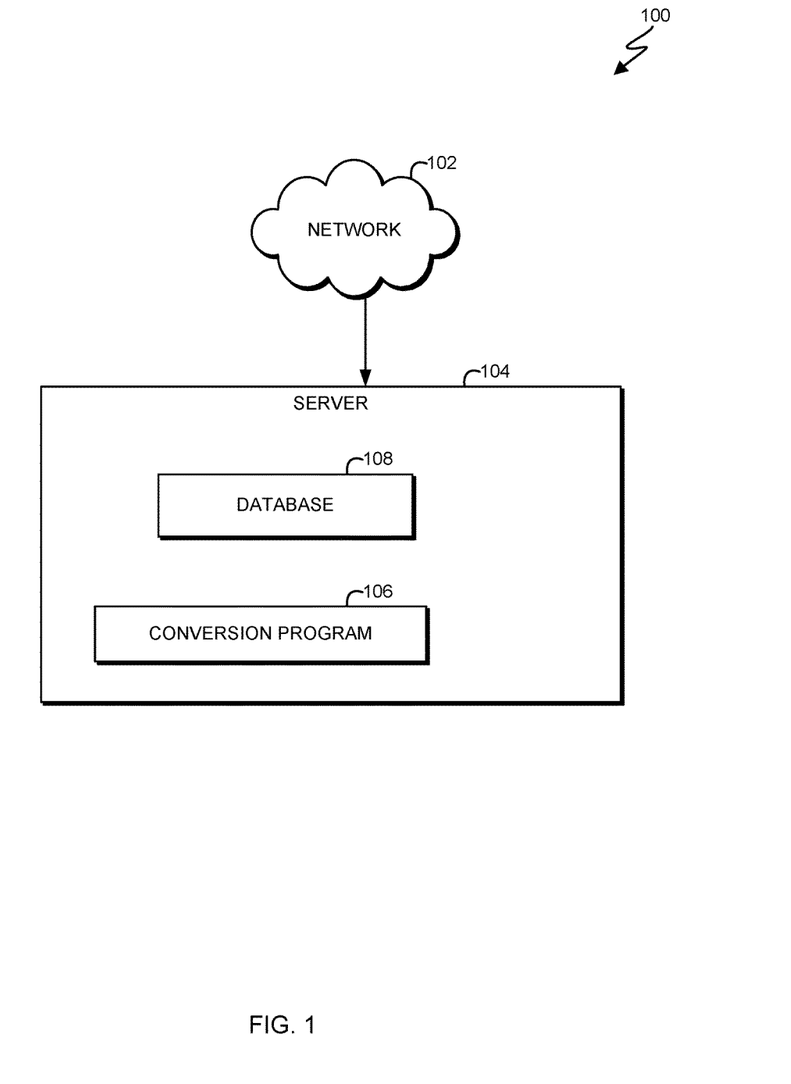
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102 and server 104. Computing environment 100 may include additional computing devices, servers, computers, components, or other devices not shown.

Network 102 may be a local area network (LAN), a wide area network (WAN) such as, the Internet, any combination thereof, or any combination of connections and protocols that support communications between server 104 in accordance with embodiments of the invention. Network 102 may include wired, wireless, or fiber optic connections.

Server 104 may be a management server, a web server, or other electronic device or computing system capable of processing program instructions and receiving and sending data. In some embodiments, server 104 may be a laptop computer, tablet computer, netbook computer, personal computer (PC), desktop computer, or any programmable electronic device capable of communicating with other devices via network 102. In other embodiments, server 104 may represent a server computing system utilizing multiple computers as a server system, such as, in a cloud computing environment. In another embodiment, server 104 represents a computing system utilizing clustered computers and nodes to act as a single pool of seamless resources. In the depicted embodiment, server 104 includes conversion program 106 and database 108. In other embodiments, server 104 may include conversion program 106, database 108, and additional programs, storage devices, or components. Server 104 may include components, as depicted and described in further detail with respect to FIG. 4.

Conversion program 106 controls the conversion of a given SPARQL query to a semantically equivalent SQL query using an algorithmic equation. Conversion program 106 uses the algorithmic equation to evaluate the elements of the SPARQL query to convert the SPARQL query to a semantically equivalent SQL. In one embodiment, conversion program 106 evaluates a triple from the SPARQL query to generate a SQL query which is transferred into a common table expressions (CTE) which is stored in a relationship database management system (RDBMS) server. A triple is a data entity composed of subject-predicate-object. In one embodiment, conversion program 106 evaluates a plurality of triples from the SPARQL query to generate a SQL query which is transferred into a CTE which is stored in a RDBMS server. A CTE is a temporary result set that is defined within the execution scope of a portion of the SPARQL. In one embodiment, a CTE is similar to a table, however, the CTE is not stored as an object in database 108 and lasts the duration of the query. In one embodiment, conversion program 106 represents SPARQL as a graph with operators represented as nodes, the initial node, AND node, UNION node, OPTIONAL node, MINUS node, etc. Each of these nodes can have a child or sub node that is dependent off the parent node or the node is a leaf node. A leaf node has no children or sub nodes, and contains at least one triple. In one embodiment, a portion of the triples in a leaf node can be related to one another by the AND operation. In the depicted embodiment, conversion program 106 is located on server 104. In other embodiments, conversion program 106 can be located on other servers, computing devices, or computers provided conversion program 106 can access database 108 via network 102.

Database 108 may be a repository that may be written to and/or read by conversion program 106. In one embodiment, database 108 contains, for example, SPARQL data, SQL data, SPARQL graphs, CTEs, result data, and other data created or collected by conversion program 106. In other embodiments, database 108 may be written to and/or read by conversion program 106 and/or additional computing devices, servers, computers, components, or additional devices not shown. In one embodiment, database 108 is a database management system (DBMS), used to allow the definition, creation, querying, update, and administration of a database(s). In another embodiment, database 108 is a relationship database management system (RDMS). In the depicted embodiment, database 108 is stored on server 104. In other embodiments, database 108 may reside on an alternative server, computer, or computing device, provided that database 108 is able to communicate with subnetwork manager 106 local agent function 108, cluster manager function 110, and other devices, programs, and components.

Figure 2:
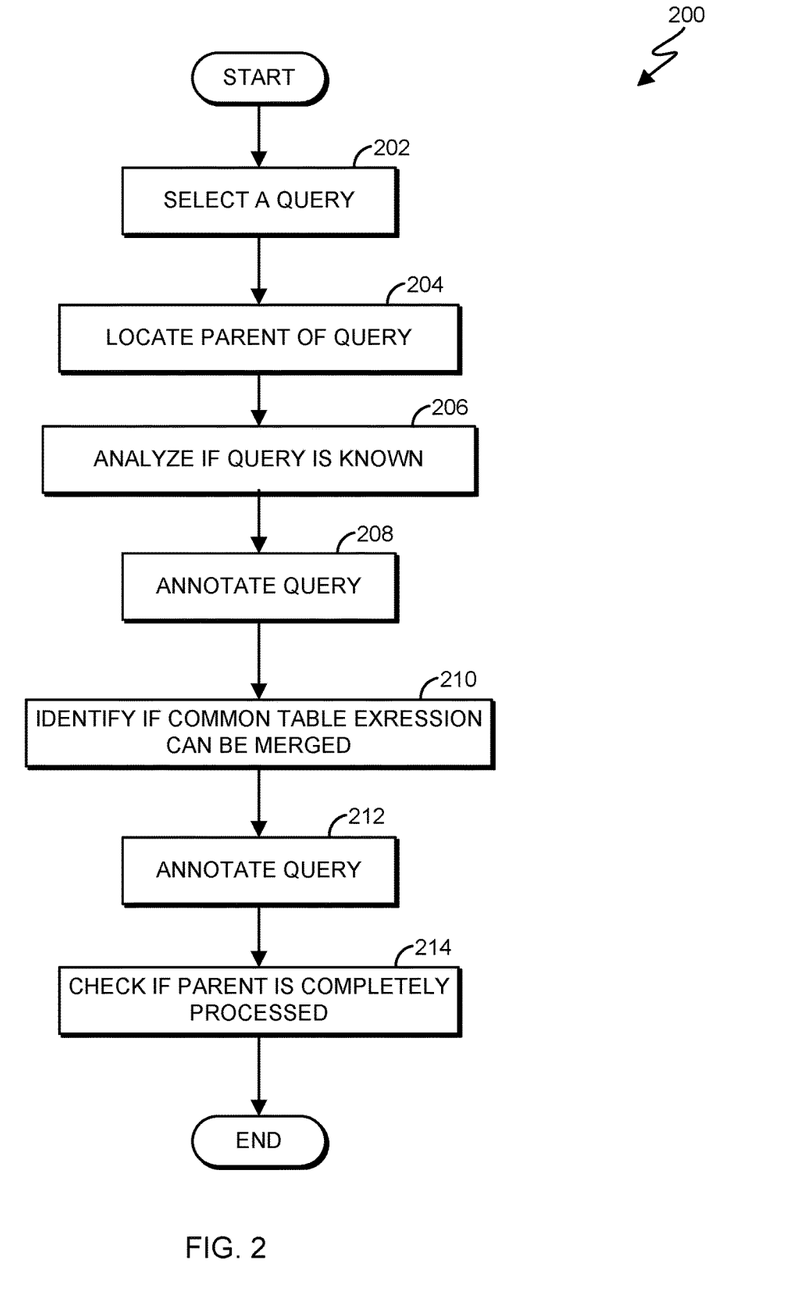
FIG. 2 depicts a flowchart of the operational steps taken by conversion program to traverse the SPARQL and generate the semantically equivalent SQL within computing environment 100 of FIG. 1, in accordance with an embodiment of the present invention.

FIG. 2 depicts a flowchart 200 of the steps taken by conversion program 106 to traverse a SPARQL query and generate a semantically equivalent SQL query within computing environment 100 of FIG. 1, in accordance with an embodiment of the present invention. Flowchart 200 depicts the conversion of a SPARQL graph to a semantically equivalent SQL query.

In step 202, conversion program 106 selects a node. A node is a section or a segment of the query language that is used to perform an action (hereinafter this node is known as the selected node). In one embodiment, conversion program 106 selects the node based on the order of the node compared to other queries. The node might be selected because the node is the first node, the last node, or the node is selected based on other predetermined factors, for example, user selected, node size, node priority rating, or node parent rating. In another embodiment, conversion program 106 selects the node based on the order a triple occurs. In another embodiment, conversion program 106 selects the node based on the priority of the node in the query logic. The query logic, can be for example, the number of outgoing and incoming queries in the SPARQL. In yet another embodiment, conversion program 106 selects a leaf node first.

In step 204, conversion program 106 locates the parent to the selected node. The parent is a node or operation which the selected node is dependent or a sub-node to. A sub-node can be, for example, a leaf node, or can have a quantity of sub-queries attached to the selected node. In one embodiment, there is more than one parent to the selected node. In another embodiment, conversion program 106 locates the parent to the selected node and also a quantity of term nodes. In one embodiment, conversion program 106 selects more than one node concurrently. A term node is a node which represent the same variable as the selected node. In one embodiment, conversion program 106 identifies the selected node as being a leaf node. In other embodiments, conversion program 106 locates a parent for a plurality of selected queries which a portion of the plurality of selected queries are sub queries to the parent.

In step 206, conversion program 106 analyzes if the node value for the variable represented by the node is known for the current evaluation. In one embodiment, conversion program 106 analyzes, for example, the selected node, the term node, the term queries, the parent, or other queries or operations in the SPARQL query. Step 206 is explained in greater detail in FIG. 3.

In step 208, conversion program 106 annotates the node. Conversion program 106 annotates the node as partially known or known. Known means all elements of the triple of term node or queries are known. Partially known means a portion of the elements of the triples of term node or queries are known. Conversion program 106 annotates the node as partially known if the node is not completely traversed. If conversion program 106 does not annotate the node as partially known, conversion program 106 annotates the node as known. In some embodiments, the node that is annotated can be, for example, the selected node, term node, parent, or other queries or operations in SPARQL query. In one embodiment, conversion program 106 marks multiple queries. In one embodiment, conversion program 106 marks the selected node, term node, parent, or other node or operation in the SPARQL query. In one embodiment, conversion program 106 marks the node as partially known if an OPTION node or operation is present between the selected node and the selected node's parent. In one embodiment, conversion program 106 marks the node if the node is a leaf node to which the node belongs is not completely traversed. In one embodiment, conversion program 106 marks several nodes concurrently. Select node is not completely traversed if the triples of the leaf node are not all evaluated. In one embodiment, conversion program 106 marks the node as known if the value of the node does not pass through an OPTION node or if a leaf node to which the node belongs is completely traversed.

In step 210, conversion program 106 identifies if the current common table expression (CTE) can be merged with another CTE. In one embodiment, conversion program 106 identifies if the current CTE can be merged with another CTE, or other CTEs. Step 210 is explained in further detail in FIG. 4.

In step 212, conversion program 106 annotates the node. Conversion program 106 annotates the node as partially known or known. Known means all elements of the triple of term node or queries are known. Partially known means a portion of the elements of the triples of term node or queries are known. In one embodiment, conversion program 106 annotates the node as partially known if conversion program 106 cannot join the node both upwards with the parent node an concurrently cannot join the node downwards with a child node. In one embodiment, conversion program 106 annotates the node as known if conversion program 106 can join the node both upwards with the parent node and concurrently join the node downwards with a child node. In some embodiments, the node that is annotated can be, for example, the selected node, term node, parent, or other nodes or operations in SPARQL query. In one embodiment, conversion program 106 marks multiple queries. In one embodiment, conversion program 106 marks the selected node, term node, parent, or other node or operation in the SPARQL query.

In step 214, conversion program 106 checks if the parent is processed. In another embodiment, conversion program 106 checks if the selected node, term node, or other queries or operations in SPARQL query are completely processed. Step 214 is explained in greater detail in FIG. 5.

Figure 3:
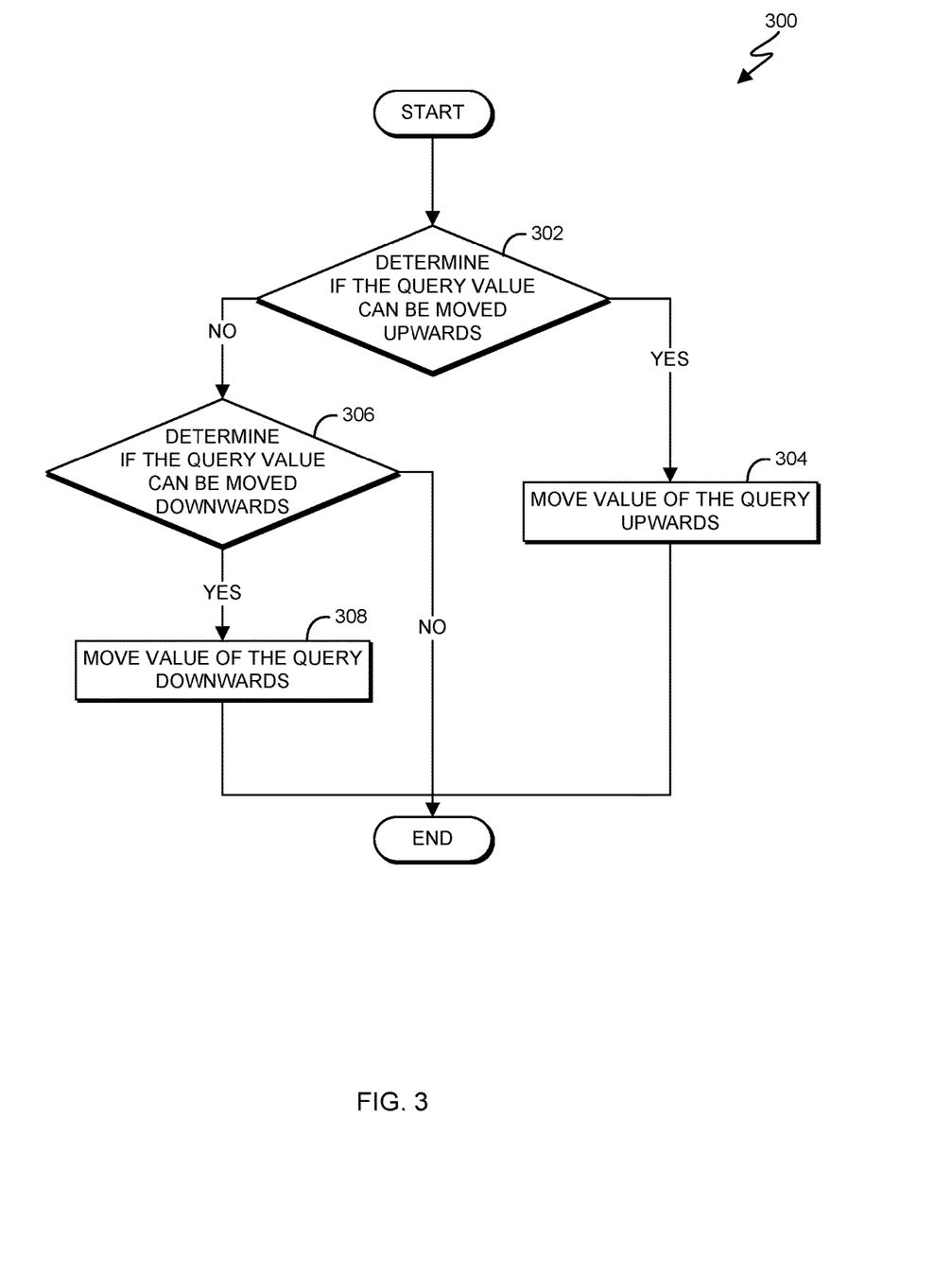
FIG. 3 depicts a flowchart of the operational step taken by conversion program to analyze if the selected node is known within computing environment 100 of FIG. 1, in accordance with an embodiment of the present invention.

FIG. 3 depicts a flowchart of the operational steps taken by conversion program 106 to analyze if the node is known within computing environment 100 of FIG. 1, in accordance with an embodiment of the present invention. Flowchart 300 depicts the analysis if the node is known. FIG. 3 depicts an embodiment of step 206 of FIG. 2 in greater detail.

In decision 302, conversion program 106 determines if the node value can be moved upwards to the parent node of the selected node. The value of the node for the variable of the selected node can be moved, for example, up to the parent or down to a sub-node. In one embodiment, the value can be moved both upwards and downwards concurrently. Conversion program 106 determines if the selected node value for the variable presented by the selected node can be moved upwards (Yes branch, proceed to step 304). In one embodiment, conversion program 106 moves the value of the selected node from the selected node to at least one of the parents of the selected node when there are no UNION or OPTIONAL operations between the selected node and the parent. In one embodiment, conversion program 106 analyzes the selected node to determine if the value of the selected node for the variable presented by the selected node can be moved upwards from the selected node to the parent if between the selected node and the parent there are no UNION or OPTIONAL operations unless the UNION or OPTIONAL operation is evaluated. If conversion program 106 determines the parent value for the variable presented by the parent cannot be moved upwards from the selected node to the parent node (No branch, proceed to decision 306), conversion program 106 determines if the selected node can be moved downwards to a child node of the selected node. In one embodiment, conversion program 106 is able to move the value of the selected node both upwards and downwards simultaneously.

In step 304, conversion program 106 moves the value of the node upwards. In one embodiment, conversion program 106 moves the value of the selected node upwards to at least one of the selected node's parent queries. In one embodiment, conversion program 106 moves the value of a term node of the selected node upwards from a term node of the selected node and at least one of the term node's parents.

In decision 306, conversion program 106 determines if the node value can be moved downwards. A downwards movement is from the selected node and at least one of the selected node's sub-queries. In one embodiment, a downward movement is from the term node of the selected node and at least one of the term node's sub-queries. A node is known if the value of the node for the variable represented by the selected node is known from the current evaluation. If conversion program 106 determines if the value of the node can be moved downwards (Yes branch, proceed to step 308), conversion program 106 moves the value of the node to a sub-node. In one embodiment, conversion program 106 determine that value of the node can be moved downwards if parent is not a UNION node. If conversion program 106 determines the value of the node cannot be moved downwards (No branch), conversion program 106 ends the process. In one embodiment, conversion program 106 determines the value of the node cannot be moved downwards because the parent is a UNION node the value of the node cannot be pushed downwards.

In step 308, conversion program 106 moves the value of the node downwards. In one embodiment, conversion program 106 moves the value of the selected node downwards to at least one of the selected node's sub-queries. In one embodiment, conversion program 106 moves the value of a term node of the selected node downwards from a term node of the selected node and at least one of the term node's sub-queries.

Figure 4:
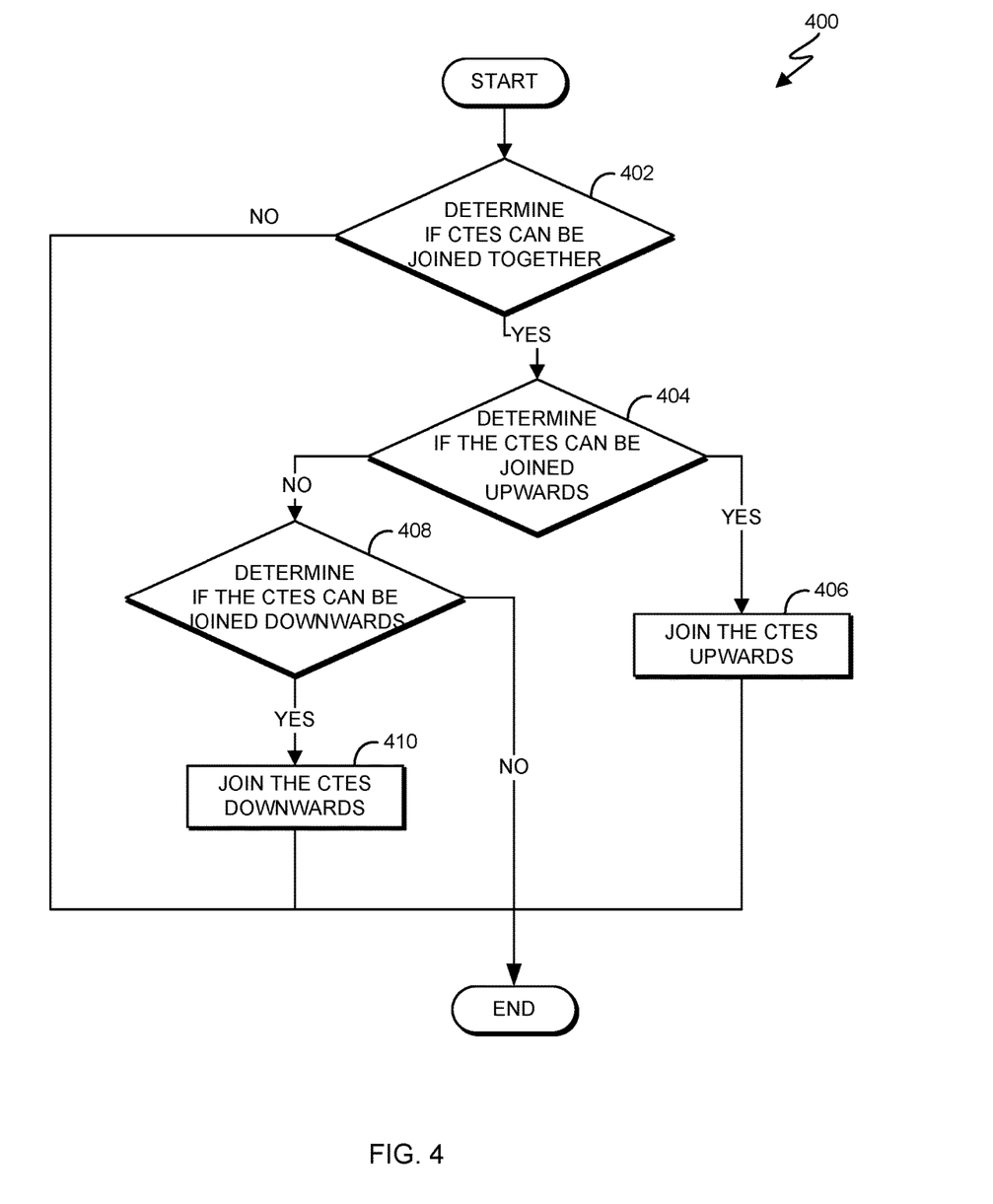
FIG. 4 depicts a flowchart of the operational steps taken by conversion program to identify if the current common table expression (CTE) can be merged within computing environment 100 of FIG. 1, in accordance with an embodiment of the present invention.

FIG. 4 depicts a flowchart of the operational steps taken by conversion program 106 to identify if the current common table expression (CTE) can be merged with another CTE within computing environment 100 of FIG. 1, in accordance with an embodiment of the present invention. Flowchart 400 depicts the identification if the current common table expression (CTE) can be merged. FIG. 4 depicts step 210 of FIG. 2 in greater detail.

In decision 402, conversion program 106 determines if CTEs can be joined together. In one embodiment, at least one of the CTEs must be for the selected node. The CTE for the selected node is generated for the triple of the selected node. In another embodiment, the CTE can be a plurality of CTEs. The CTE to be joined with the CTE from the selected node, can be generated, for example, for previous parents, selected queries, term queries, future parents, future selected queries, future term queries, and other queries. In one embodiment, a join of CTEs is possible if the at least two queries are related via an AND operation. In another embodiment, several CTEs can be merged together concurrently from parent nodes, child nodes, and/or leaf nodes. If conversion program 106 determines that at least two CTEs can be joined together (Yes branch, proceed to decision 404), conversion program 106 determines if the at least two CTEs can be joined upwards. If conversion program 106 determines if the at least two CTEs cannot be joined together (No branch, Proceed to END), conversion program 106 ends the process.

In decision 404, conversion program 106 determines if CTEs can be joined upwards. An upwards join is from the selected node to at least one of the selected node's parents. In one embodiment, an upwards movement is from the term node of the selected node to at least one of the term node's parents. Conversion program 106 determines if an upwards merge is not possible between the node and the parent if there is not an OPTION operation between the parent and the node (Yes branch, step 406), conversion program 106 joins the CTEs. Conversion program 106 determines if an upwards merge is possible between the node and the parent if there is an OPTION operation (No branch, decision 408), conversion program 106 determines if a join can be performed downwards.

In step 406, conversion program 106 joins the CTEs upwards. In one embodiment, conversion program 106 joins the CTE of the selected node to at least one of the selected node's parents. In one embodiment, conversion program 106 joins the CTEs upwards from a term node of the selected node and at least one of the term node's parents.

In decision 408, conversion program 106 determines if the CTEs can be joined downwards. A downwards join is from the selected node and at least one of the selected node's sub-queries. In one embodiment, a downward movement is from the term node of the selected node and at least one of the term node's sub-queries. If conversion program 106 identifies a downwards merger is possible between the parent and a sub node there is not an OPTION operation (Yes branch, proceed to 410). If conversion program 106 identifies a downwards merger is possible between the parent and a sub node there is an OPTION operation (No branch, proceed to END).

In step 410, conversion program 106 joins the CTEs downwards. In one embodiment, conversion program 106 joins the CTE of the selected node to at least one of the selected node's sub-queries. In one embodiment, conversion program 106 joins the CTEs downwards from a term node of the selected node and at least one of the term node's sub-queries.

Figure 5:
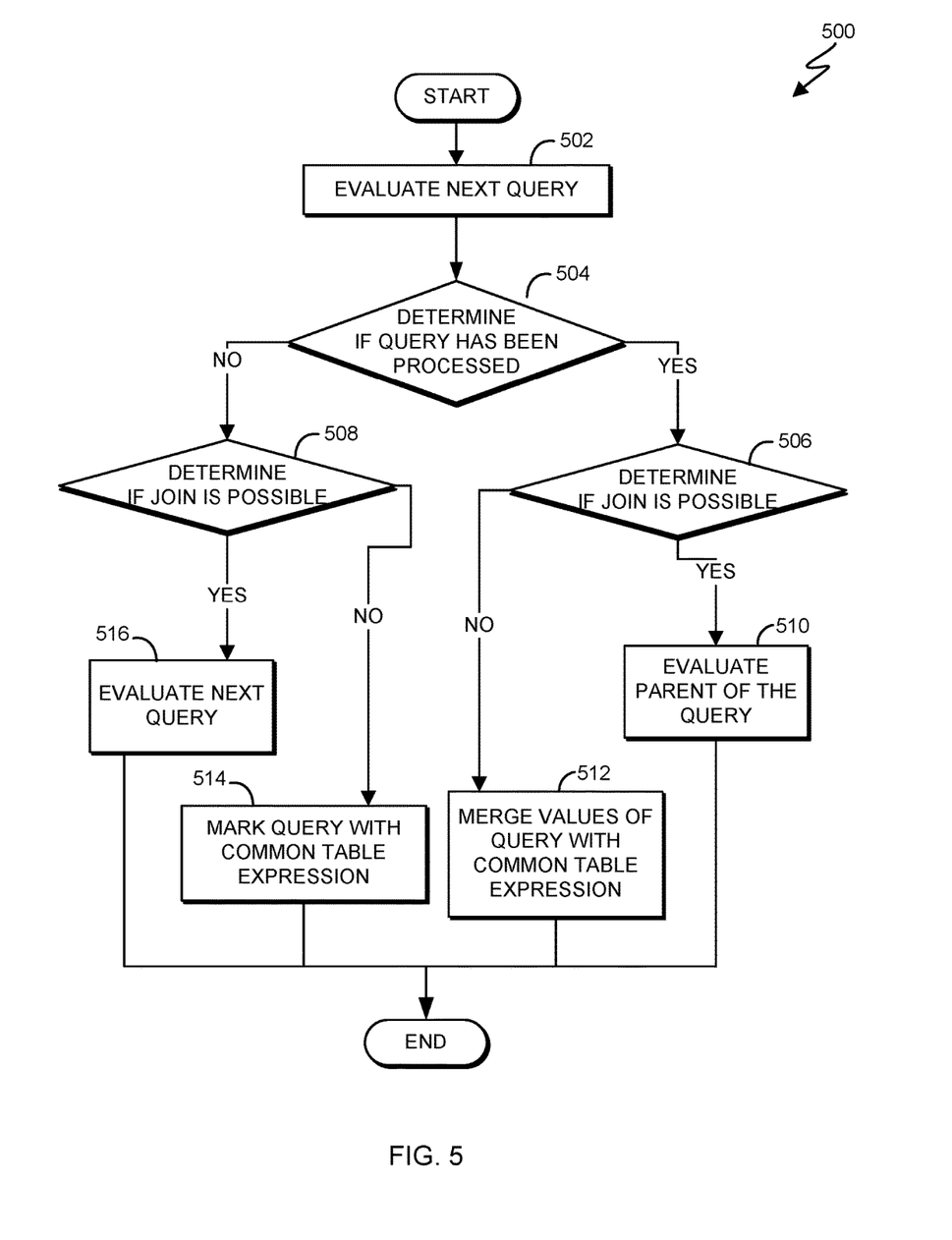
FIG. 5 depicts a flowchart of the operational steps taken by conversion program to check if the operator is processed within computing environment 100 of FIG. 1, in accordance with an embodiment of the present invention.

FIG. 5 depicts a flowchart of the operational steps taken by conversion program 106 to check if the parent is processed within computing environment 100 of FIG. 1, in accordance with an embodiment of the present invention. Flowchart 500 depicts the check of the parent to determine if the parent is processed.

In step 502, conversion program 106 evaluates the next node. In one embodiment, conversion program 106 selects the next term node to be evaluated based on the priority of the next node in the queue logic. The queue logic can be for example the number of outgoing and incoming queries in the SPARQL. In one embodiment, conversion program 106 selects the next node to be evaluated based on the hierarchy in the node graph. The hierarchy can be, for example, the next level sub-node, the next node numerically, or other forms of hierarchy that can exist in the node graph. In one embodiment, conversion program 106 performs the evaluation of the selected node, and a plurality of nodes concurrently. The plurality of nodes can be the next node, nodes related to the selected nodes, or random nodes that assist in the process to complete the triple of the selected node.

In decision 504, conversion program 106 determines if the node has been processed. A node is processed if no more triples are left to be evaluated. The node can be, for example, a leaf node, a parent, a selected node, a term node, or another node in the SPARQL query. If conversion program 106 determines the node has been processed (Yes branch, proceed to decision 506), conversion program 106 determines if a join is possible. If conversion program 106 determines the node has not been processed (No branch, proceed to decision 508), conversion program 106 determines if a join is possible.

In decision 506, conversion program 106 determines if a join is possible. In one embodiment, the join is between a node and a parent of the node. In another embodiment, the join is between a term node and a parent of the term node. A join is the exchange of the data or information between the two queries. In one embodiment, the exchange of data is of the known triple data. If conversion program 106 determines a join is possible if the selected node is completely evaluated (YES branch, proceed to 510), conversion program 106 evaluates the parent of the selected node. If conversion program 106 determines a join is not possible (No branch, proceed to 512), conversion program 106 analyzes the parent of the selected node.

In decision 508, conversion program 106 determines if a join is possible. In one embodiment, the join is between a node and a parent of the node. In another embodiment, the join is between a term node and a parent of the term node. A join is the exchange of the data or information between the two queries. In one embodiment, the exchange of data is of the known triple data. If conversion program 106 determines a join is possible if the selected node is completely evaluated (YES branch, proceed to 514), conversion program 106 evaluates the next node. If conversion program 106 determines a join is not possible (No branch, proceed to END), conversion program 106 marks the selected node. In one embodiment, conversion program 106 joins the several nodes concurrently.

In step 510, conversion program 106 evaluated the parent of the selected node. In one embodiment, the evaluation performed by conversion program 106 on the parent of the selected node is the process performed in FIGS. 2-5. In another embodiment, the evaluation performed by conversion program 106 on the parent is a transfer of the triple data from the select node to the parent. In another embodiment, the parent, can be a plurality of parents that are all parents to the selected node.

In step 512, conversion program 106 analyzes the parent of the selected node. In one embodiment, conversion program 106 analyzes the parent and check for any results that are marked on the parent, and joins the results with the associated CTE. In another embodiment, conversion program 106 analyzes the parent and checks for any triple data and merges the triple data with the associated CTE.

In step 514, conversion program 106 marks the selected node. In one embodiment, conversion program 106 marks the selected node with a corresponding CTE. Conversion program 106 marks the selected node with the corresponding CTE so that once completion of the operator evaluation is completed the corresponding CTE is joined with the results generated. In another embodiment, conversion program 106 marks the selected node with the CTE of a parent, term node, or other node that would meet a predetermined threshold of similarity.

Figure 6:
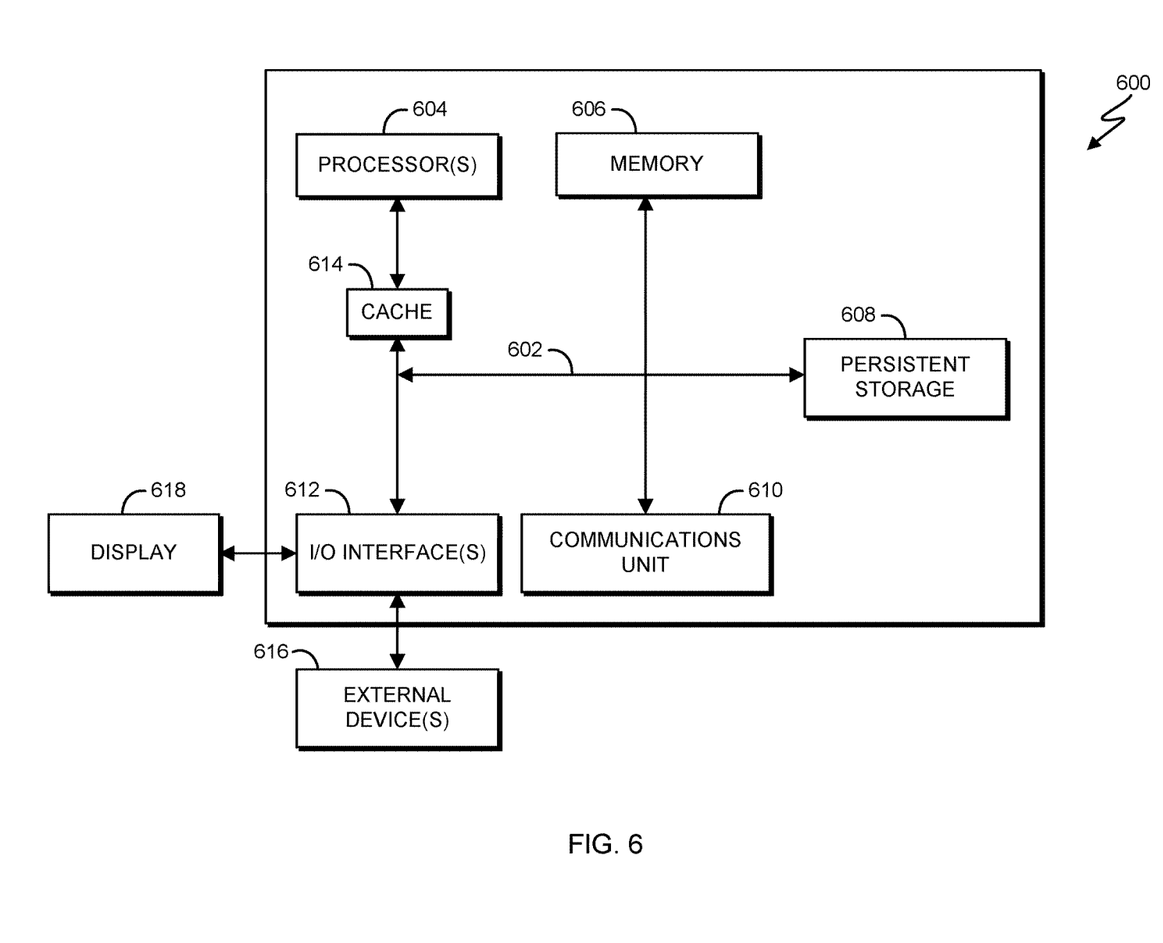
FIG. 6 depicts a block diagram depicting the internal and external components of the server of FIG. 1, in accordance with one embodiment of the present invention.

FIG. 6 depicts a block diagram 600 of components of server 104, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server 104 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as, microprocessors, communications and network processors, etc.), system memory, peripheral devices, and any additional hardware components within a system. For example, communications fabric 602 can be implemented with one or more buses.

Memory 606 and persistent storage 608 are computer-readable storage media. In one embodiment, memory 606 includes random access memory (RAM) and cache memory 614. In general, memory 606 can include any suitable volatile or non-volatile computer-readable storage media.

Memory 606 is stored for execution by one or more of the respective computer processors 604 of server 104 via one or more memories of memory 606 of server 104. In the depicted embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in the examples, provides for communications with other data processing systems or devices, including server 104. In the examples, communications unit 610 includes one or more network interface cards. Communications unit 610 may provide communications through the use of either or both physical and wireless communications links.

I/O interface(s) 612 allows for input and output of data with other devices that may be connected to server 104. For example, I/O interface 612 may provide a connection to external devices 616 such as, a keyboard, keypad, camera, a touch screen, and/or some other suitable input device. External devices 616 can also include portable computer-readable storage media such as, for example, thumb drives, portable optical or magnetic disks, and memory cards. Software and data used to practice embodiments of the present invention, e.g., function of statistical machine translation program 108 can be stored on such portable computer-readable storage media and can be loaded onto persistent storage 608 of server 104 via I/O interface(s) 612 of server 104. Software and data used to practice embodiments of the present invention, e.g., conversion program 106 can be stored on such portable computer-readable storage media and can be loaded onto persistent storage 608 of server 104 via I/O interface(s) 612 of server 104. I/O interface(s) 612 also connect to a display 618.

Display 618 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punch-cards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for traversing a SPARQL query and translating the SPARQL query to a semantically equivalent SQL query, the computer system comprising:
   one or more computer processors;
   one or more non-transitory computer readable storage media;
   program instructions stored on the one or more computer non-transitory readable storage media for execution by at least one of the one or more computer processors, the program instructions comprising:
   program instructions to select, by one or more processors, a first node of the SPARQL query;
   program instructions to identify, by the one or more processors, a parent node of the first node;
   program instructions to determine, by the one or more processors, that a value of the first node is unknown;
   program instructions to respond to determining that the value of the first node is unknown, annotating, by the one or more processors, the first node to indicate that the first node is at least partially unknown;
   program instructions to identify, by the one or more processors, a common table expression of the first node;
   program instructions to determine, by the one or more processors, that the common table expression of the first node matches, within a first predetermined threshold, a common table expression of a second node;
   program instructions to determine, by the one or more processors, that the common table expression of the first node matches, within a second predetermined threshold, the common table expression of the second node and a common table expression of a third node concurrently;

program instructions to merge, by the one or more processors, information from the common table expression of the first node with information from the common table expression of the second node and information from the common table expression of the third node concurrently;
program instructions to merge, by the one or more processors, information from the common table expression of the second node with the common table expression of the first node;
program instructions to determine, by the one or more processors, that the value of the first node can be relocated to a third node;
program instructions to merge, by the one or more processors, the value of the first node with the third node;
program instructions to identify, by the one or more processors, a common table expression of the third node;
program instructions to determine, by the one or more processors, that the common table expression of the third node matches, within a third predetermined threshold, a common table expression of a fourth node;
program instructions to merge, by the one or more processors, information from the common table expression of the third node with the common table expression of the first node;
program instructions to determine, by the one or more processors, the value of the first node can be relocated to the second node and the third node concurrently;
program instructions to respond to merging the information from the common table expression of the second node with the common table expression of the first node, annotating, by the one or more processors, the common table expression of the first node to indicate that the information from the common table expression of the second node has been merged with the common table expression of the first node;
program instructions to determine, by the one or more processors, whether a triple associated with the first node is evaluated;
program instructions to respond to determining, whether the triple associated with the first node is evaluated, merging, by the one or more processors, at least a portion of the triple associated with the first node with at least a portion of the second node;
program instructions to create, by the one or more processors, an SQL query based on the merged common table expressions; and
program instructions to retrieve, by the one or more processors, data from a database using the SQL query.

* * * * *